Feb. 9, 1954 H. W. KLAS 2,668,512
FAIRED TOWING MEANS FOR ANTITORPEDO DEVICES
Filed April 15, 1943 6 Sheets-Sheet 2

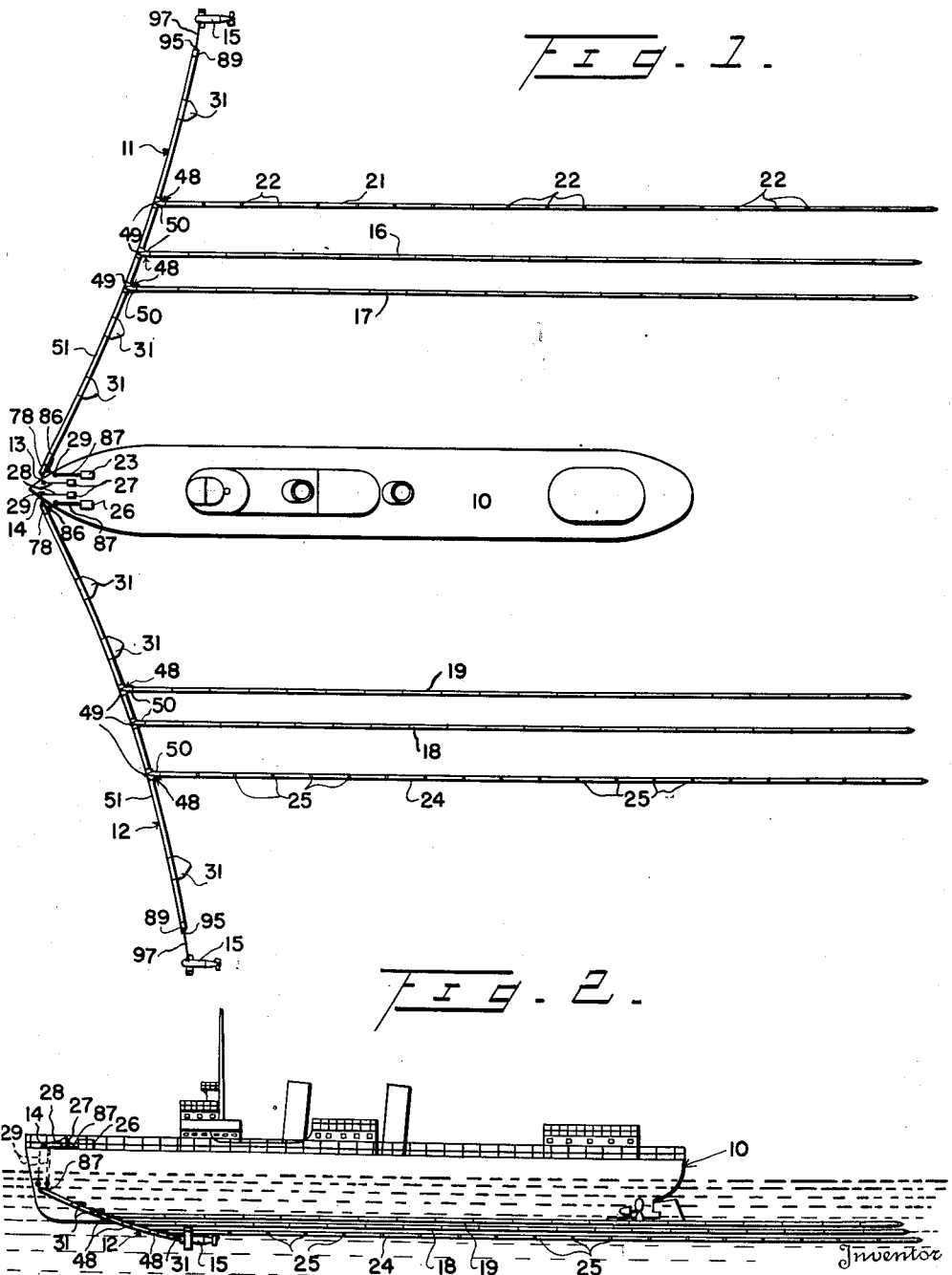

Inventor
H. W. KLAS
By
Attorney

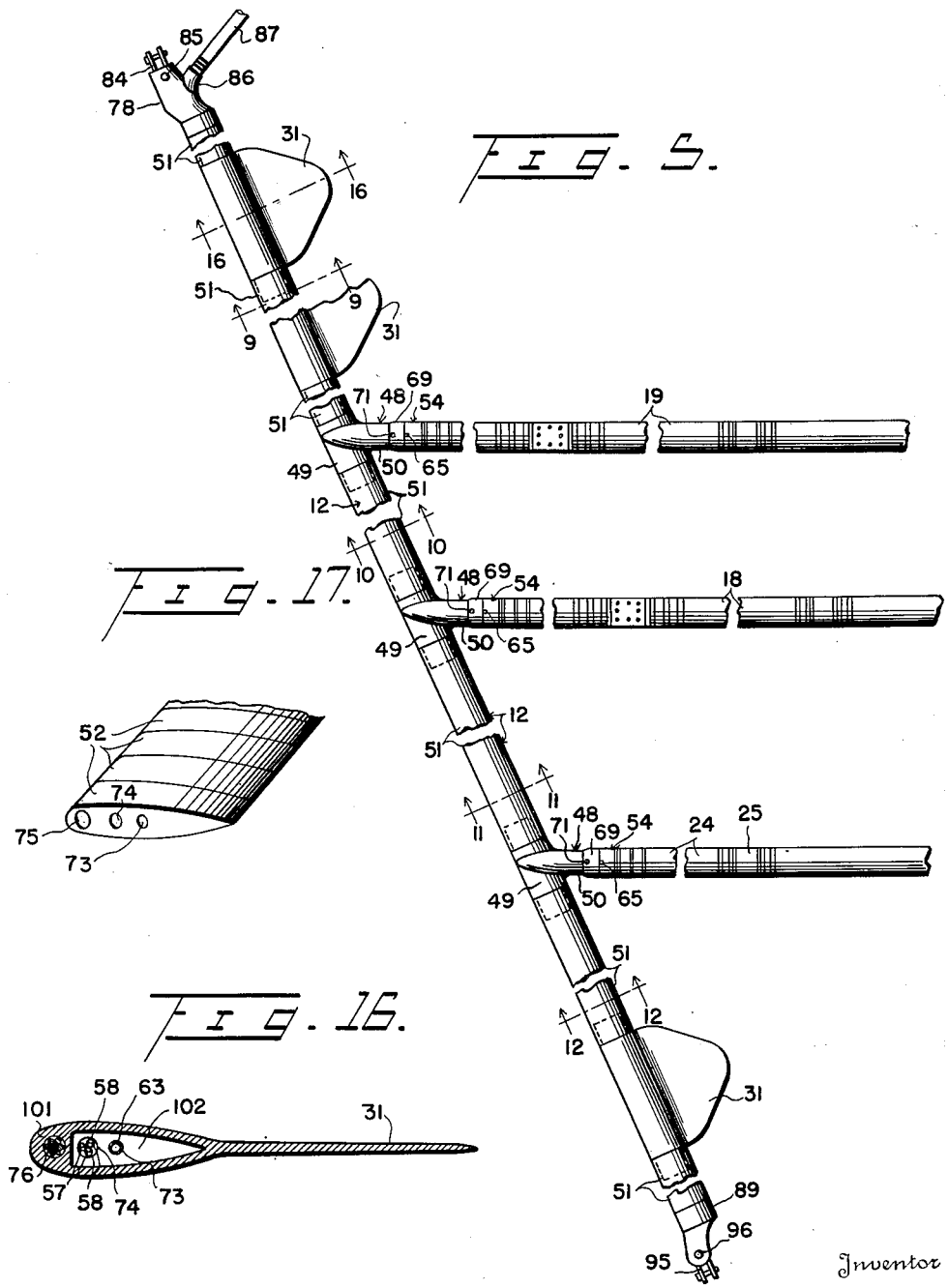

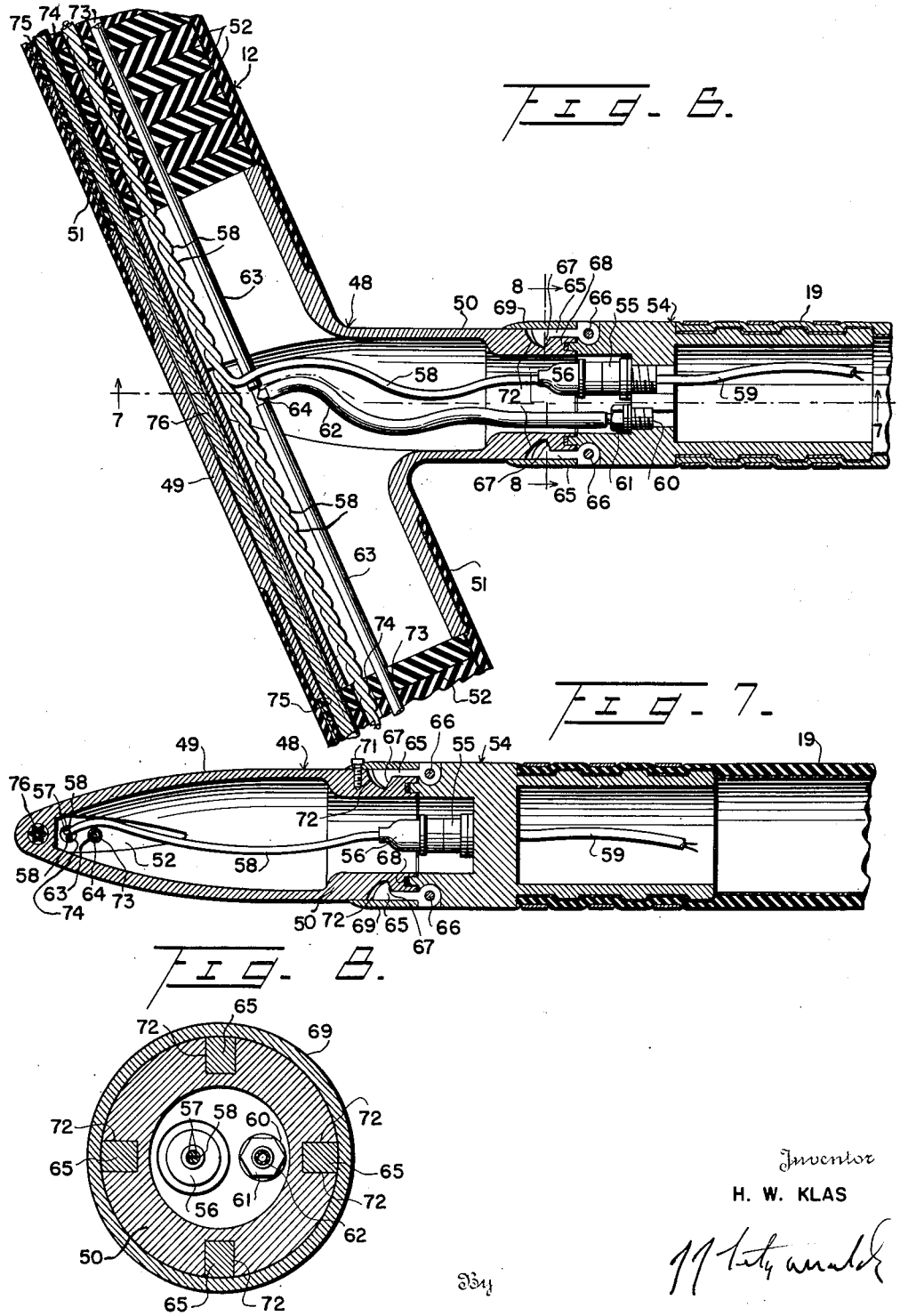

Feb. 9, 1954 H. W. KLAS 2,668,512
FAIRED TOWING MEANS FOR ANTITORPEDO DEVICES
Filed April 15, 1943 6 Sheets-Sheet 6
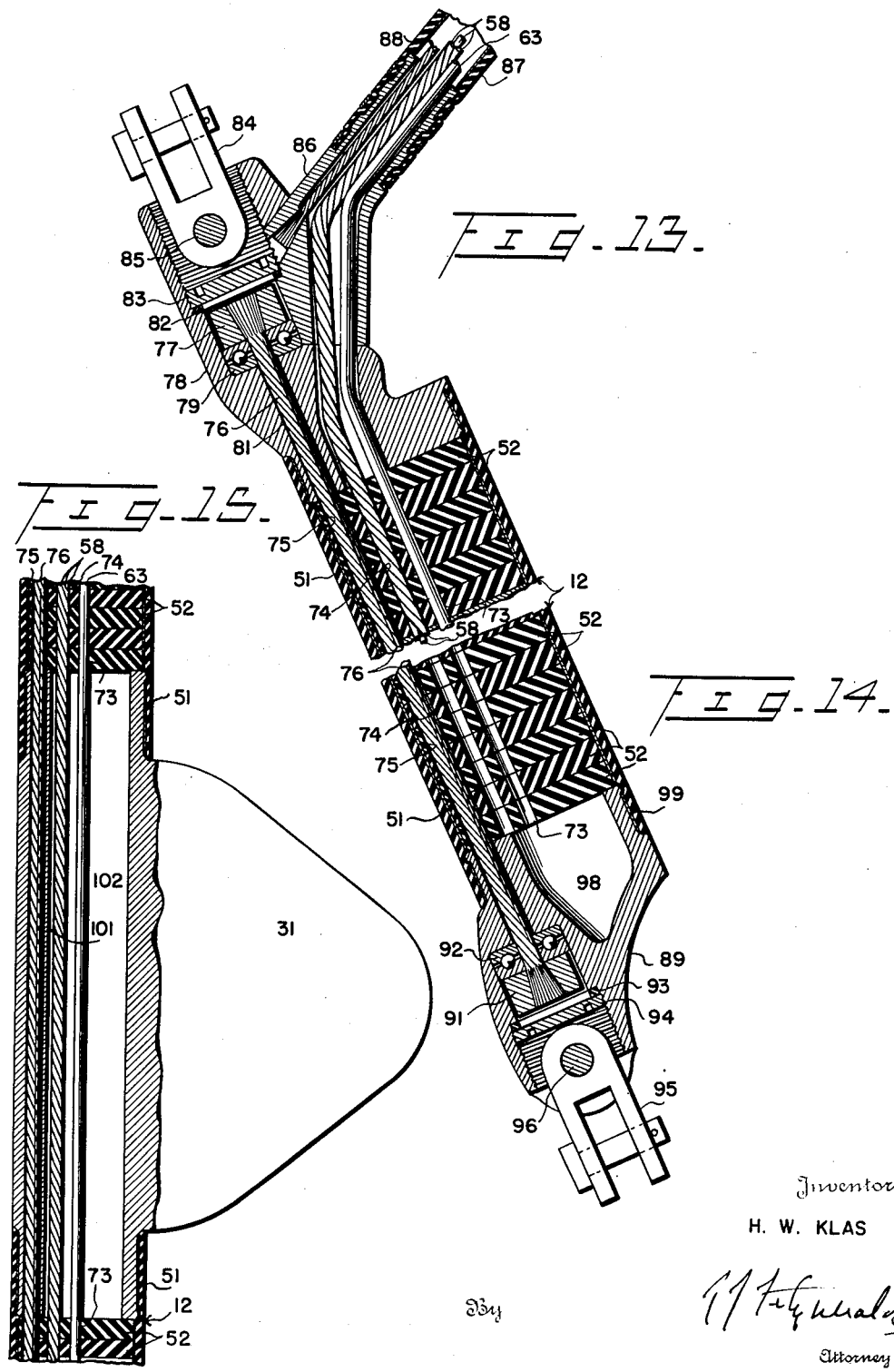
Inventor
H. W. KLAS Patented Feb. 9, 1954

2,668,512

UNITED STATES PATENT OFFICE 2,668,512

FAIRED TOWING MEANS FOR ANTITORPEDO DEVICES

Harold W. Klas, Lansing, Mich.

Application April 15, 1943, Serial No. 483,105

5 Claims. (Cl. 114—240)

(Granted under Title 35, U. S. Code (1952), sec. 266)

This invention relates to anti-torpedo devices in which a plurality of streamers are towed through the water by a vessel at a predetermined distance therefrom and more particularly to the fairing of the means employed for towing the streamers, the streamers having arranged therein an explosive charge adapted to destroy the torpedo in response to a signal received from a plurality of torpedo detecting devices arranged within at least one of the streamers.

The invention is particularly suited for use with an arrangement in which a plurality of explosive streamers are towed beneath the surface of the water by a towing cable or supply line secured to a vessel, the supply line having a paravane or depressor attached to the free end thereof whereby the streamers are maintained in a predetermined position within the water substantially parallel to the vessel and spaced laterally therefrom.

In such systems for protecting a vessel against torpedo attack it has been the usual practice to secure the streamers to a tubular towing cable or supply line having a cylindrical contour throughout substantially the length of the towing cable, in which the cable is continuously maintained at an angle with respect to the vessel by a paravane arranged within the water and secured to the free end of the towing cable. The explosive streamers, as will be readily understood, are of necessity arranged within the water at a distance from the vessel sufficient to prevent injury or damage to the vessel as a result of the explosion of the streamers and the towing cable, therefore, to which the streamers are attached extends for a considerable distance in a lateral direction from the vessel and is continuously maintained in this relative position by reason of the aforesaid paravanes. Furthermore, the supply line is provided with a steel tow cable arranged therein to which the paravane is attached and provided with means adapted to maintain a connection continuously between each of the streamers and a source of supply of compressed air carried by the vessel in addition to a plurality of detecting and firing circuits arranged therein.

In the arrangement of the present invention the towing cable is faired thereby to reduce the drag of the water on the cable and the tension applied thereto by the towing vessel. The improved faired cable is also provided with a plurality of stabilizing devices arranged at intervals along the cable adapted to maintain the cable at a predetermined depth of submersion regardless of the roll and pitch of the vessel and the action of the waves in the water.

The streamers are adapted to be connected to the faired towing cable during the launching operation, it being the usual practice to launch the streamers from the vessel and secure the leading end of the streamers to the towing cable during the paying out of the towing cable from the vessel, suitable connecting devices being arranged at intervals along the towing cable to facilitate the establishment of the connection of the streamers thereto whereby the streamers may be connected quickly and securely to the towing cable and the electrical and air connections established thereto by reason of the provision of certain connecting elements arranged within the devices.

One of the objects of the present invention is a new and improved supply line for towing streamers through the water at a distance from a vessel controlled by a paravane or depressor in which the angle of the tow line with respect to the vessel is substantially increased.

Another of the objects of the invention is the provision of new and improved means for preventing vibration of a towing cable having a paravane or depressor secured thereto as the cable is moved through the water by a towing vessel.

Another of the objects is the provision of a faired towing cable having a plurality of streamers secured thereto and maintained in predetermined relative position with respect to a towing vessel by a paravane or depressor disposed within the water in which torsional effects caused by a tension applied to the tow cable are eliminated.

Another of the objects is the provision of a new and improved service line for an explosive streamer having a paravane or depressor operatively connected thereto for maintaining the explosive streamer at a predetermined distance from the moving vessel in which the drag of the water against the service line is greatly reduced.

A still further object is the provision of a new and improved tow line for a paravane or depressor in which the life of the tow line in service is greatly increased.

Still other objects and advantages will become apparent from the following description taken in connection with the accompanying drawings, in which:

Fig. 1 shows in diagrammatic form a complete system according to a preferred embodiment of the invention;

Fig. 2 is a view in elevation of the arrangement of Fig. 1;

Fig. 5 is an enlarged plan view partly broken away of one of the faired tow lines of Fig. 1 and streamers connected thereto;

Fig. 6 is an enlarged plan view partly in section and partly broken away of one of the coupling devices of Fig. 5;

Fig. 7 is a sectional view taken substantially along the line 7—7 of Fig. 6;

Fig. 8 is a sectional view somewhat enlarged taken along the line 8—8 of Fig. 6;

Fig. 13 is an enlarged sectional view of the inner end of the faired towing cable and the supply line connected thereto;

Fig. 14 is an enlarged sectional view of the outer end of the faired towing cable;

Fig. 15 is a sectional view of the faired towing cable partly broken away showing one of the stabilizing fins;

Fig. 16 is a sectional view somewhat enlarged taken along the line 16—16 of Fig. 5;

Fig. 17 is a view in perspective partly broken away showing a plurality of members for fairing a tow cable in the assembled position with the outer cover removed;

Figure 3:
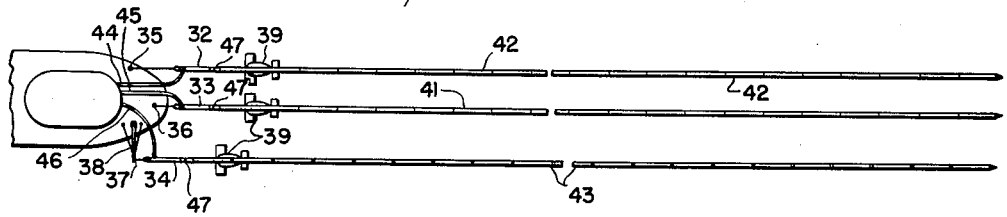
Fig. 3 shows diagrammatically an alternative arrangement of streamers employing the present invention.

Referring now to the drawings for a more complete understanding of the invention and more particularly to Figs. 1 and 2 thereof there is shown thereon in diagrammatic form a vessel indicated generally by the numeral 10 having a pair of faired towing cables or supply lines 11 and 12 connected thereto as at 13 and 14 respectively, each of the towing cables being provided with a paravane 15 connected to the free end thereof and adapted to maintain the cables at a predetermined angle with respect to the vessel as the vessel moves through the water. Each of the towing cables or lines 11 and 12 has secured thereto a pair of explosive streamers respectively, the pair of streamers connected to the cable 11 being designated by the numerals 16 and 17 and the pair of streamers connected to the towing cable 12 by the numerals 18 and 19. There is also connected to the towing cable 11 intermediate the explosive streamer 16 and the paravane, a flexible hose or streamer 21 having a plurality of microphonic devices 22 adapted to control a signal amplifier 23 arranged on the vessel and explode the streamers 16 and 17 in succession as successive signals are received by the microphonic devices 22.

In a similar manner the towing cable 12 is connected to a tubular streamer or hose 24 having a plurality of microphonic devices 25 therein adapted to control a signal amplifier 26 arranged on the vessel and fire the explosive streamers 18 and 19 in succession as successive signals are received by the microphonic devices 25. Each of the signal amplifiers 23 and 26 is preferably provided with or operatively connected to a filter mechanism individual thereto whereby the associated firing circuit is adapted to be closed only in response to signals of predetermined character received through the water by the microphonic devices. Each of the faired tow lines is drawn into the position shown on Figs. 1 and 2 with respect to the vessel by any suitable means such, for example, as the winch mechanisms 27 and lines 28 secured thereto, the lines 28 preferably being arranged within the tubular members 29 whereby the lines 28 are adapted to emerge from the vessel below the waterline.

Each of the paravanes 15 is provided with a hydrostatically controlled depth regulating mechanism thereby to maintain the paravanes at a predetermined depth of submersion as the paravanes are towed through the water by the vessel. By providing an arrangement in which the inner end of each of the faired tow lines is connected to the vessel at a point beneath the waterline and a depth controlled paravane is attached at the free end thereof, the faired tow cable is maintained continuously at a predetermined depth of submersion throughout the entire length of the tow cable during the towing operation and prevented from weaving upwardly and downwardly within the water by the provision of a plurality of stabilizing fins 31 secured thereto as will more clearly appear as the description proceeds. Each of the streamers is inflated with compressed air sufficiently to impart a small degree of positive buoyancy thereto whereby the streamers are adapted to float upon the surface of the water when the vessel is not in motion and to be drawn beneath the water substantially to the depth of submersion of the faired towing cable when the vessel is under way, the pressure of the water on the submerged streamers causing the streamers to be compressed sufficiently to reduce the specific gravity thereof to substantially the specific gravity of the surrounding water. Each of the streamers is operatively connected to a source of supply of compressed air on the vessel by way of a flexible duct or tube arranged within each of the supply lines 11 and 12 respectively through which compressed air is supplied in sufficient quantity to maintain the specific gravity of the streamers preferably somewhat less than the specific gravity of the surrounding water during the towing operation.

Each of the streamers is detachably secured to the faired towing cable during the launching operation by a quick detachable coupling individual to each of the streamers, the coupling including means for establishing a plurality of circuit connections to the microphonic and detonating devices arranged within the streamers and for completing an air connection between the aforesaid duct or tube arranged within the towing cable and the interior of the streamers. Prior to launching the streamers within the water the streamers are inflated with sufficient air to apply a positive degree of buoyancy thereto as the streamers are launched within the water, the air within the streamers being prevented from escaping by a check valve arranged therein adapted to permit the flow of air to the streamer when the pressure within the aforesaid duct exceeds the pressure of the air within the streamer.

Figure 4:
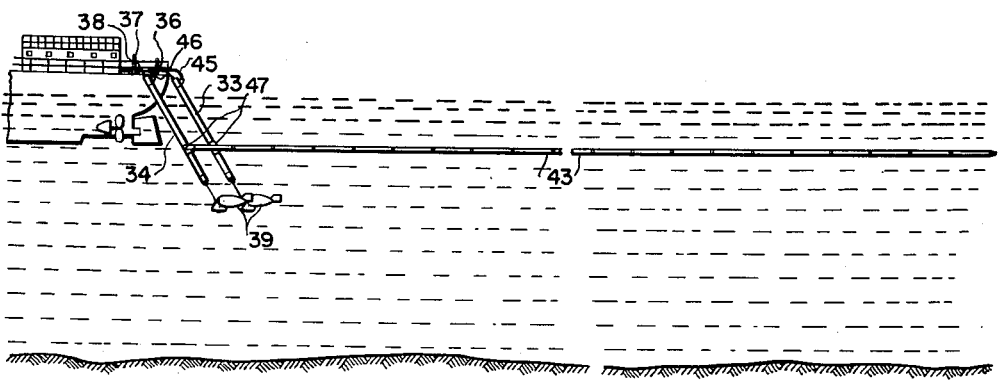
Fig. 4 is a view in elevation of the arrangement of Fig. 3.

On Figs. 3 and 4 is shown in plan and elevation respectively an alternative arrangement for towing a plurality of streamers from a vessel in which the streamers are towed from the stern of the vessel by a plurality of faired towing cables 32, 33 and 34 secured to the vessel as at 35, 36 and 37 respectively, the point of connection 37 being preferably maintained laterally at a distance from the vessel as by the boom 38 projecting outwardly therefrom. Each of the faired tow lines 32, 33 and 34 is inclined at a relatively sharp angle with respect to the vessel by reason of the provision of the depressors 39 respectively connected thereto. A pair of explosive streamers 41 and 42 are connected to the faired tow cables 33 and 32 respectively and adapted to be fired in succession as successive signals are received by the microphonic devices arranged within the streamer 43 secured to the tow cable 34. The faired tow cables 32, 33 and 34 are provided with supply lines 44, 45 and 46 respectively connected thereto having means for establishing a plurality of circuit connections between the electro-responsive detonating devices within the explosive streamers and the signal amplifier aboard the vessel and for establishing an air connection between a source of supply of compressed air on the vessel and the interior of each of the explosive streamers.

Each of the explosive streamers is detachably secured to the associated towing cable by a coupling device indicated at 47, the coupling devices being generally similar to the coupling devices of Fig. 1. The arrangement disclosed on Figs. 3 and 4 is particularly suitable for protecting the vessels in a convoy for the reason that the faired towing cables are relatively short and the streamers employed with this arrangement, therefore, may be of considerably greater length than the streamers of Fig. 1.

On Fig. 5 is shown an enlarged view of the faired tow line 12 employed with the arrangement of Fig. 1 having the streamers 18, 19 and 24 connected thereto by the coupling device 48. The arrangement of the coupling device 48 associated with the streamer 19 and the connections established thereby will best be understood by consideration of Figs. 6, 7 and 8 of the drawings. The coupling device 48 comprises a tubular portion 49 adapted to be connected at one end thereof to a length of flexible casing 51 composed of any material suitable for the purpose such, for example, as rubber or any of the synthetic varieties thereof arranged about a plurality of spacing members 52 to which the casing is secured in any suitable manner. The opposite end of the tubular portion 49 of the coupling device 48 is fitted to an adjacent length of casing 51 provided with a plurality of additional spacing members 52 arranged therein.

The coupling device 48 also includes a tubular portion 50 extending rearwardly therefrom adapted to be engaged by a complementary recessed portion of the coupling 54 having the streamer 19 connected thereto. The coupling 54 is provided with a plug 55 arranged therein adapted to be engaged by the jack 56 and establish an electrical circuit between the pair of conductors 57 within the cable 58 and the pair of conductors within the cable 59 thereby establishing a control circuit to an electro-responsive detonating device within the streamer 19 whereby the streamer is adapted to be exploded in response to a signal received from the microphonic devices within the streamer 24. There is also arranged within the coupling 54 a coupling device 60 adapted to be engaged by the coupling 61 and establish an air connection between the interior of the streamer 19 and the source of supply of compressed air on board the vessel by way of the flexible tube 62 and duct 63 connected thereto as by the T connector 64.

When the electrical and pneumatic connections have been established between the streamer 19 and the vessel by the connection devices within the coupling 54, the coupling 54 is brought into abutting relation with the tubular portion 50 of the coupling device 48 and secured thereto by any suitable means as by the latches 65 pivotally supported to the coupling 54 as at 66 and adapted to engage complementary recessed portions 67 within the coupling device 48 and compress a gasket 68 sufficiently to insure a watertight connection between the coupling 54 and the coupling device 48. The latches are maintained in the locked position in any suitable manner as by the locking ring 69 adapted to be moved along the tubular portion 50 of the coupling device 48 to the position shown on Figs. 6 and 7 and secured thereto by at least one screw 71. The tubular portion 50 of the coupling device 48 is preferably slotted as at 72 thereby to prevent rotational movement of the coupling 54 with respect to the coupling device 48 when the parts are locked together by the latches and locking ring aforesaid.

The spacing members 52 are composed of material suitable for the purpose such, for example, as laminated canvas impregnated with a binder such, for example, as rubberized fabric and provided with apertures 73, 74 and 75, the outside portion of the spacers being streamlined substantially as shown on Figs. 9 to 12. The flexible tube or duct 63 is adapted to be arranged within the aperture 73 and the cables 58 are adapted to be arranged within the aperture 74, there being one cable 58 respectively associated with each of the explosive streamers and the microphone streamer connected to the faired towing cable 12. There is arranged within the aperture 75 of each of the spacers 52 a tow line or cable 76 preferably composed of steel having a predetermined tension initially imparted thereto and possessing a high tensile strength extending throughout the length of the faired tow line to which the paravane is attached whereby the tension caused by the pull of the paravane is applied by way of the cable 76 to the towing means aboard the vessel. The inner end of the cable 76 is secured to a collar 77, Fig. 13, arranged within a recess within the member 78, a thrust bearing 79 being arranged between the collar and the bottom of the recess to provide for rotative movement of the cable 76 and collar 77 with respect to the member 78. The cable 76 passes through a cylindrical aperture 81 within the member 78 of sufficient size to permit rotative movement of the cable with respect thereto. An arrangement is thus provided in which rotative movement of the cable as a result of the tension applied thereto by the paravane is prevented from being transmitted to the member 78. The thrust bearing 79 may, if desired, be supplied with a lubricant suitable for the purpose thereby to decrease the frictional load between the collar 77 and the member 78, the lubricant being retained by a gasket 82 and plug 83 threaded within the member 78 adapted to exclude the sea water therefrom. The member 78 is attached to the vessel by the shackle 84 pivotally secured to the member 78 as by the pin or bolt 85, the towing connection being completed by the line 28 arranged within the tubular member 29 and passing over the winch 27, Fig. 2.

The member 78 is also provided with a tubular branch or portion 86 to which is secured a flexible hose or tube 87 having the other end thereof secured to the vessel thereby to enclose and protect the cables 58 and air duct 63 arranged therein and prevent the entrance of sea water within the faired tow cable. A steel cable 88 secured at one end of the branch member 86 in any well known manner and at the other end thereof to the vessel is also preferably arranged within the hose 87 thereby to prevent tension being applied to the hose 87 sufficient to disengage the hose from the branch 86 or move the hose relative thereto sufficiently to cause the joint therebetween to be ineffective to exclude water from the interior of the member 78.

The opposite end of the tow line 76 is rotatably secured to the member 89 by reason of the provision of a collar 91, Fig. 14, attached to the cable and a thrust bearing 92 disposed within the member 89 in abutting relation with the collar. If desired, the bearing 92 may be supplied with a lubricant sealed in by the gasket 93 and plug 94 threaded within the member 89. A shackle 95 pivotally secured to the member 89 as at 96 is employed for establishing a towing connection to the paravane 15, Fig. 1, by means of the line 97 secured thereto. The member 89 is recessed at 98 and provided with a reduced portion 99 to which is secured in any suitable manner as by molding the parts together a length of the flexible sheath or casing 51.

The faired towing cable also includes a plurality of fins or stabilizers 31 arranged thereon at intervals to which the casing 51 is attached in watertight relation therewith as by molding the parts together, each of the fins 31 having a cylindrical portion 101 therein within which the tow line 76 is disposed. Each of the fins 31 is also provided with a recessed portion 102 of sufficient size to enclose and protect the cables 58 and air duct 63.

Figure 18:
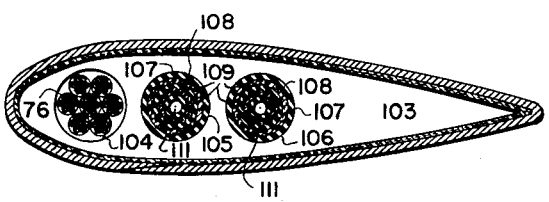
Fig. 18 is a view partly in section of an alternative form of faired tow cable suitable for use with the present invention; and, Fig. 19 is an enlarged sectional view of one of the supply members employed with the arrangement of Fig. 18.
Figure 19:
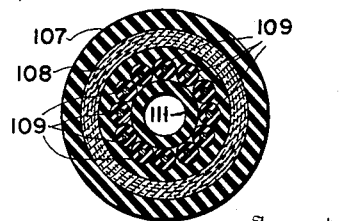
Figure 9:
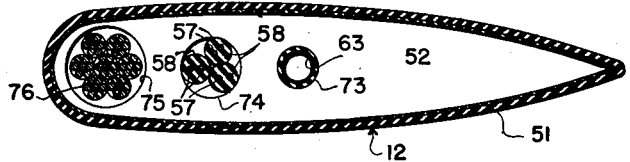
Figs. 9 to 12 are enlarged sectional views taken along the lines 9—9 to 12—12 respectively of Fig. 5.
Figure 10:
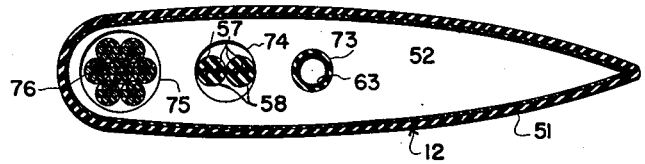
Figure 11:
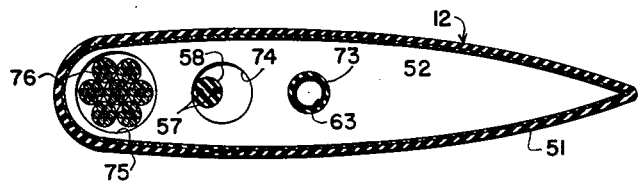
Figure 12:
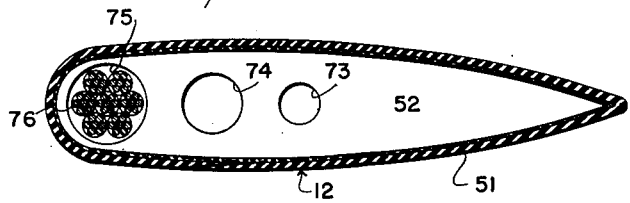

On Fig. 18 is shown an alternate arrangement of faired towing cable suitable for use with the present invention comprising a plurality of spacing members 103 arranged in abutting relation with each other and provided with apertures 104, 105 and 106 arranged therein. Within the aperture 104 is disposed the tow line 76. Within the apertures 105 and 106 are respectively arranged a pair of flexible cables comprising an outer covering or sheath 107 molded about a tubular member 108 composed preferably of fabric within which is arranged a plurality of electrical conductors 109 for establishing external circuit connections to the electro-responsive detonating devices within the explosive streamers and to the microphonic devices within the detecting streamer. The conductors are arranged circumferentially about a flexible duct 111 through which is established an air connection between the source of supply of compressed air aboard the vessel and each of the streamers. It will, of course, be understood that each of the coupling devices employed for attaching the explosive streamers to the faired towing cable includes means for establishing an operative connection between each of the streamers and the flexible duct 111 and for establishing a circuit connection between the devices within the streamers and the conductors within the tubular member 108.

Briefly stated in summary, the present invention provides an arrangement for protecting a vessel comprising a faired towing cable having a paravane or depressor secured to the free end thereof and a plurality of streamers secured at intervals thereto in which means are provided for establishing a plurality of electrical control connections to the streamers and for maintaining the streamers continuously inflated to a predetermined degree of pressure by a source of compressed air on board the vessel, and in the provision of means for preventing substantial vibrational movement of the faired towing cable as the paravane or depressor is towed through the water by the vessel and for continuously maintaining the towing cable at a predetermined depth of submersion throughout the entire length of the towing cable during the towing operation.

While the invention has been described with reference to two examples thereof which give satisfactory results, it will be understood by those skilled in the art to which the invention pertains, after understanding the invention, that various changes and modifications may be made without departing from the spirit and scope of the invention and it is my intention, therefore, in the appended claims to cover all such changes and modifications.

The invention herein described and claimed may be manufactured and used by and for the Government of the United States of America for governmental purposes without payment of any royalties thereon or therefor.

What is claimed as new and desired to be secured by Letters Patent of the United States is:

1. In a system of the character disclosed for disabling a torpedo comprising an explosive streamer and a detecting streamer disposed within a body of water, said detecting streamer having a plurality of microphonic devices arranged therein, the combination of a vessel, a faired tow line comprising a plurality of closely spaced articulated faired members and secured to the vessel, a paravane attached to the free end of said tow line and disposed within the water, means for coupling said streamers to the faired tow line, a source of compressed air carried on the vessel, means disposed within the faired tow line for connecting each of the streamers to said source of compressed air, and means including a plurality of electrical conductors arranged within the tow line for exploding said explosive streamers selectively in accordance with signals received from said microphonic devices.

2. In a device of the character disclosed for destroying a torpedo comprising an elongated flexible member having an explosive charge therein and arranged within the water, a vessel, a faired tow line secured to the vessel, means for coupling the flexible member to said tow line, means attached to the free end of the tow line for causing the flexible member to be towed through the water along a path of travel different from the path of travel of the vessel, a duct connected to one end of said faired tow line for establishing a connection between the tow line and the vessel, a source of supply of compressed air on the vessel, means including a flexible tube arranged within the tow line and said duct for operatively connecting said flexible member to said source of compressed air, electro-responsive means arranged within the flexible member adapted to fire said explosive charge, and means including a pair of conductors arranged within said faired tow line and the duct for establishing an external electrical connection to said electro-responsive means.

3. An ordnance weapon of the character disclosed for destroying a torpedo comprising a flexible firing tube having an explosive charge therein and arranged within the water, a vessel, a tow line secured to said vessel, means for coupling the firing tube to said tow line, means attached to the free end of the tow line for causing the firing tube to be towed through the water along a path of travel different from the path of travel of the vessel, a flexible faired sheath arranged about said tow line adapted to reduce the drag of the tow line through the water, an elongated flexible member having a plurality of microphonic devices therein adapted to detect the approach of a torpedo, means for securing said elongated member to said tow line in spaced relation with respect to said firing tube, means including a flexible tubular member arranged within said faired sheath for continuously maintaining said flexible firing tube and elongated flexible member inflated to a predetermined degree of pressure, and means including a plurality of electrical conductors arranged about said flexible tube within the faired sheath for establishing a plurality of external electrical connections to said firing tube and to said microphonic devices respectively.

4. A faired towing cable for use with a plurality of underwater devices and adapted to be towed by a vessel as herein disclosed comprising, a wire tow line, means for rotatably connecting the tow line to the vessel, a plurality of faired members sleeved on the tow line and having means for coupling said devices thereto in watertight relation therewith, a plurality of stabilizing fin members sleeved on the tow line intermediate adjacent pairs respectively of said coupling members, a plurality of flexible faired means sleeved on the tow line for connecting the coupling and fin members together in watertight and flexible relation with respect to each other, a paravane, means for rotatably connecting the free end of the tow line to the paravane thereby to allow the tow line to rotate as tension is applied thereto by the water action on the paravane without applying a torsional stress to the towing cable on the paravane.

5. In a device of the character described adapted to be towed by a vessel comprising a tow cable, tubular streamers connected to the tow cable, air conducting means located in the cable for supplying air pressure to the streamers, said cable comprising a wire tow line having one end rotatably connected to said vessel, faired coupling members sleeved on the tow line for coupling the streamers to the tow line and the air conducting means, stabilizing fin members sleeved on the tow line intermediate said coupling members, flexible faired means sleeved on the tow line for connecting said coupling and fin members together in watertight and flexible relation with respect to each other, a paravane, and means for rotatably connecting the free end of the wire tow line to the paravane thereby to allow the tow line to rotate as tension is applied thereto by the water action on the paravane.

HAROLD W. KLAS.

References Cited in the file of this patent

UNITED STATES PATENTS

| Number | Name | Date |
|---|---|---|
| 1,319,565 | Burney | Oct. 21, 1919 |
| 2,397,957 | Freeman | Apr. 9, 1946 |
| 2,404,440 | Holm | July 23, 1946 |
| 2,423,591 | Flude | July 8, 1947 |

FOREIGN PATENTS

| Number | Country | Date |
|---|---|---|
| 108,761 | Great Britain | Aug. 23, 1917 |
| 273,766 | Great Britain | Nov. 10, 1927 |